(12) United States Patent  (10) Patent No.: US 7,252,426 B2
Lin  (45) Date of Patent: Aug. 7, 2007

(54) LIGHT GUIDE DEVICE AND BACKLIGHT MODULE USING THE SAME

(75) Inventor: Jhy-Chain Lin, Fullerton, CA (US)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 48 days.

(21) Appl. No.: 11/198,741

(22) Filed: Aug. 5, 2005

(65) Prior Publication Data

US 2006/0028845 A1  Feb. 9, 2006

(30) Foreign Application Priority Data

Aug. 6, 2004  (TW) ................ 93123615 A

(51) Int. Cl.
*F21V 7/04* (2006.01)
(52) U.S. Cl. ...................................... 362/616
(58) Field of Classification Search ................ 362/616, 362/615
See application file for complete search history.

(56) References Cited

U.S. PATENT DOCUMENTS 5,555,160 A * 9/1996 Tawara et al. .............. 362/613
6,132,048 A * 10/2000 Gao et al. ...................... 353/20
6,295,104 B1 9/2001 Egawa et al.
6,791,639 B2 * 9/2004 Colgan et al. ................ 349/95
2001/0002164 A1 * 5/2001 Ludwing et al. .............. 362/31
2005/0088838 A1 * 4/2005 Tsai ............................. 362/31

FOREIGN PATENT DOCUMENTS

TW  547670  8/2003
TW  552439  9/2003
TW  556843  10/2003

* cited by examiner

*Primary Examiner*—Sandra O'Shea
*Assistant Examiner*—James W Cranson, Jr.
(74) *Attorney, Agent, or Firm*—Morris Manning & Martin LLP; Tim Tingkang Xia, Esq.

(57) ABSTRACT

A light guide device (1) and a backlight module (3) using the same. The light guide device includes a light guide plate (11) and a reflective mirror (10). The light guide plate has at least one light receiving surface (111), and two opposite light emitting surfaces (112,113). The reflective mirror is set between the light emitting surfaces, and is integrally manufactured with the light guide plate. The light guide device and backlight module using the same may be applied to optoelectronic devices, such as liquid crystal displays, overhead projectors, etc. The light guide device has a simple structure, and transforms light from at least one light source (31) into two surface light sources emitting light with uniform brightness.

19 Claims, 2 Drawing Sheets

LIGHT GUIDE DEVICE AND BACKLIGHT MODULE USING THE SAME

TECHNICAL FIELD

The present invention relates to a liquid crystal device, and more specifically, to a light guide device and a backlight module with two light emitting surfaces.

BACKGROUND

Liquid crystal is a substance that does not radiate light, but instead receives light and is capable of manipulating the received light. This means that a liquid crystal display device requires a light source in order to display images and data. In a typical liquid crystal display device, a backlight module using electric energy supplies the light, and a light guide plate in the backlight module converts the supplied light into uniform surface light for displaying of the images.

The light guide plate is one of the key components of a backlight module for ensuring that the surface light has uniform brightness and color. For example, a typical light guide plate converts a linear light source (such as a lamp) into a surface light source by changing pathways of light emitted from the lamp. In particular, reflection dots formed on the light guide plate help improve brightness and uniformity of the surface light obtained.

Taiwan Patent No. 552,439 issued on Sep. 1, 2003 provides a light guide plate with two light emitting surfaces, and part of the light guide plate is represented in FIG. 4. The light guide plate 4 includes a light receiving surface (not shown), two opposite light emitting surfaces 42, 43, and numerous light dividing parts 44 distributed in inclined orientations within the light guide plate 4. Each light dividing part 44 has one convex surface 441 and one plate surface 442. The convex surface 441 generally faces toward the light receiving surface (not shown), and divides incident light beams into two parts: reflection beams and refraction beams. The reflection beams propagate through the light emitting surface 42, and the refraction beams propagate through the light emitting surface 43.

This kind of light guide plate has a number of problems, including: (1) the structure is complicated, and it is not easy to manufacture the light guide plate 4; (2) the light dividing parts 44 are made in the light guide plate 4 by injection molding, and the shape of the light dividing parts 44 may be damaged when drawing of patterns; (3) because the shape and alignment of the light dividing parts 44 are difficult to make precisely, it is not easy to control the brightness and uniformity of light emitted from the light guide plate 4.

In consideration of the problems of the prior art, what is needed is a light guide device that has a simple structure and provides good brightness and uniformity of light emission.

SUMMARY

The present invention provides a light guide device. The light guide device includes a light guide plate and a reflective mirror. The light guide plate has at least one light receiving surface and two opposite light emitting surfaces. The reflective mirror is located between the two opposite light emitting surfaces and manufactured with the light guide plate as one. In a preferred embodiment, the reflective mirror may be silver and there are reflective dots on which.

The present invention also provides a backlight module using the same light guide device. The backlight module includes a light guide device, one light source and two light diffusers. The light guide device includes a light guide plate and a reflective mirror. The light guide plate has one light receiving surface and two opposite light emitting surfaces. The reflective mirror is located between the two opposite light emitting surfaces and manufactured with the light guide plate as one. The light source is placed toward the light receiving surface of the light guide device. The light source may be light emitting diode, phosphor lamp and natural light. The two light diffusers are placed above the two surfaces of the light guide device.

The light guide device and backlight module using the same may be applied to optoelectronic devices, such as liquid crystal displays, overhead projectors, etc. Comparing to the prior art, the present invention has a simpler structure, and therefore is relatively easy to manufacture. The reflective mirror is used to divide the incident light source into two emitting surfaces of the light guide device averagely. The reflective dots are made on the reflective mirror and transform the light source into the surface light, and can control the brightness uniformity of the surface light effectively.

Other advantages and novel features of the preferred embodiment of the invention will be drawn from the following detailed description with reference to the attached drawings, in which:

DETAILED DESCRIPTION OF PREFERRED EMBODIMENTS

Hereinafter, preferred embodiments of the present invention will be described. However, the scope of the present invention is not to be taken as being limited to the described embodiments.

Figure 1:
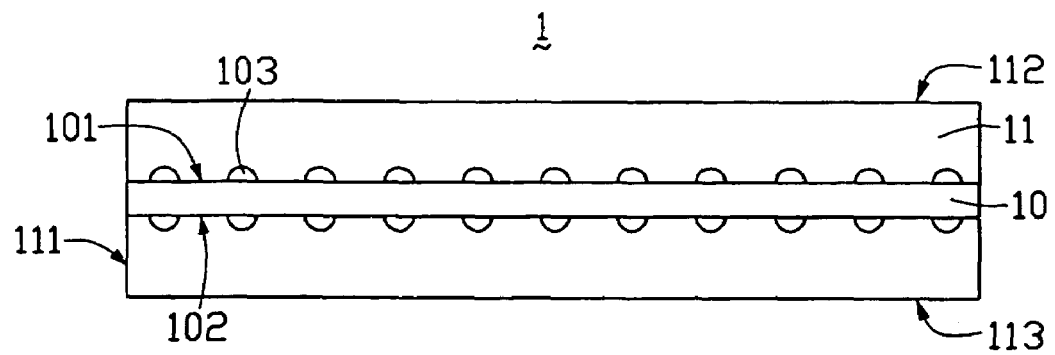
FIG. 1 is a schematic, cross-sectional view of a light guide device according to a preferred embodiment of the present invention.

FIG. 1 is a schematic, cross-sectional view of a light guide device 1 of a backlight module of a display device according to the first preferred embodiment of the present invention. The light guide device 1 includes a light guide plate 11 and a reflector like a reflective mirror 10. The light guide plate 11 has at least one light receiving surface 111 and two opposite light emitting surfaces 112, 113. The reflective mirror 10 is set between the light emitting surfaces 112, 113, and is integrally manufactured with the light guide plate 11. In the illustrated embodiment, the reflective mirror 10 is set midway between the light emitting surfaces 112, 113. The reflective mirror 10 may be silver, and preferably comprises a plurality of reflective dots 103 on opposite interfaces 101, 102 thereof. The reflective dots 103 may be hemispherical, and may be distributed on the interfaces 101, 102 directly opposite each other.

A process for forming the light guide device 1 comprises the following steps. First, the reflective dots 103 are formed on the interfaces 101, 102 of the reflective mirror 10. Then remaining body portions of the light guide plate 11 are formed on the opposite sides of the reflective mirror 10 including the reflective dots 103. Because the reflective mirror 10 is located in the middle of the light guide plate 11, incident light (not shown) coming from the light receiving surface 111 can be divided into two parts. After reflection and refraction of the light by the reflective dots 103, the light propagates through the two emitting surfaces 112, 113 with uniform brightness.

Figure 2:
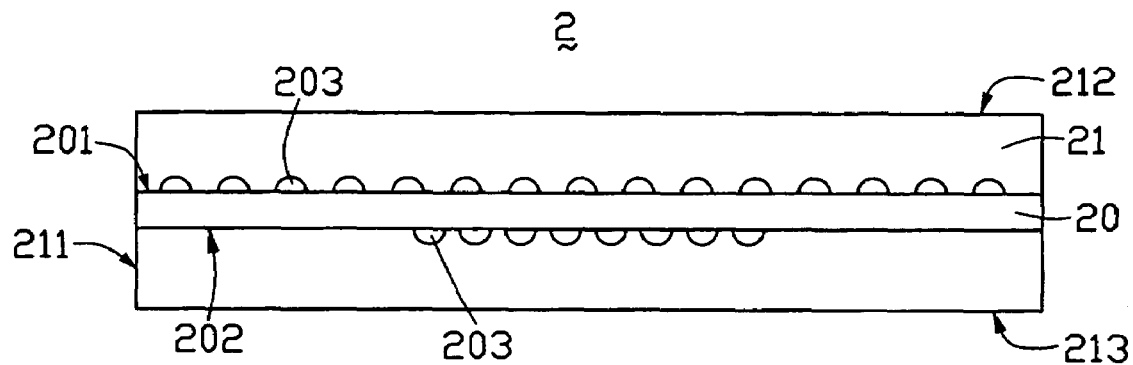
FIG. 2 is a schematic, cross-sectional view of a light guide device according to another preferred embodiment of the present invention.

FIG. 2 is a schematic, cross-sectional view of a light guide device 2 according to the second preferred embodiment of the present invention. The light guide device 2 includes a light guide plate 21 and a reflective mirror 20. The light guide plate 21 has one light receiving surface 211 and two opposite light emitting surfaces 212, 213. The reflective mirror 20 is set between the light emitting surfaces 212, 213, and is integrally manufactured with the light guide plate 21. The reflective mirror 20 may be silver, and preferably comprises a plurality of reflective dots 203 on opposite interfaces 201, 202 thereof. The reflective dots 203 may be hemispherical, and may be distributed on the interfaces 201, 202 in a generally staggered manner, for example as shown in FIG. 2. Further, the interface 201 may have reflective dots 203 distributed throughout an entire area thereof, while the interface 202 may have reflective dots 203 distributed throughout a central area thereof only. A process for forming the light guide device 2 is substantially the same as the process for forming the light guide device 1 of the first preferred embodiment.

In the illustrated embodiments, the light guide plates 11, 21 are generally flat, and have a uniform thickness. In the alternative embodiments, the light guide plates 11, 21 may be wedge-shaped, curved, etc. In the illustrated embodiments, the reflective dots 103, 203 are hemispherical. In the alternative embodiments, the reflective dots 103, 203 may be dome-shaped, pyramidal, conical, frustum-shaped, and so on.

Figure 3:
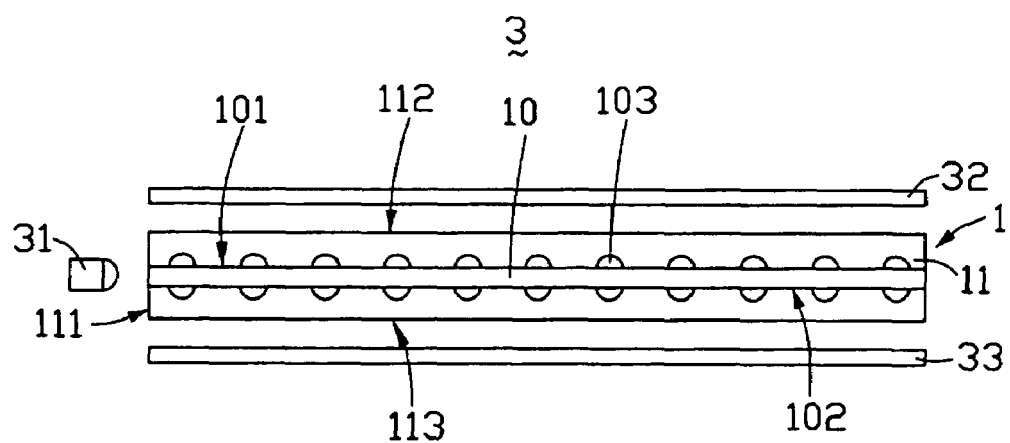
FIG. 3 is a schematic, cross-sectional view of a backlight module incorporating the light guide device of FIG. 2.
Figure 4:
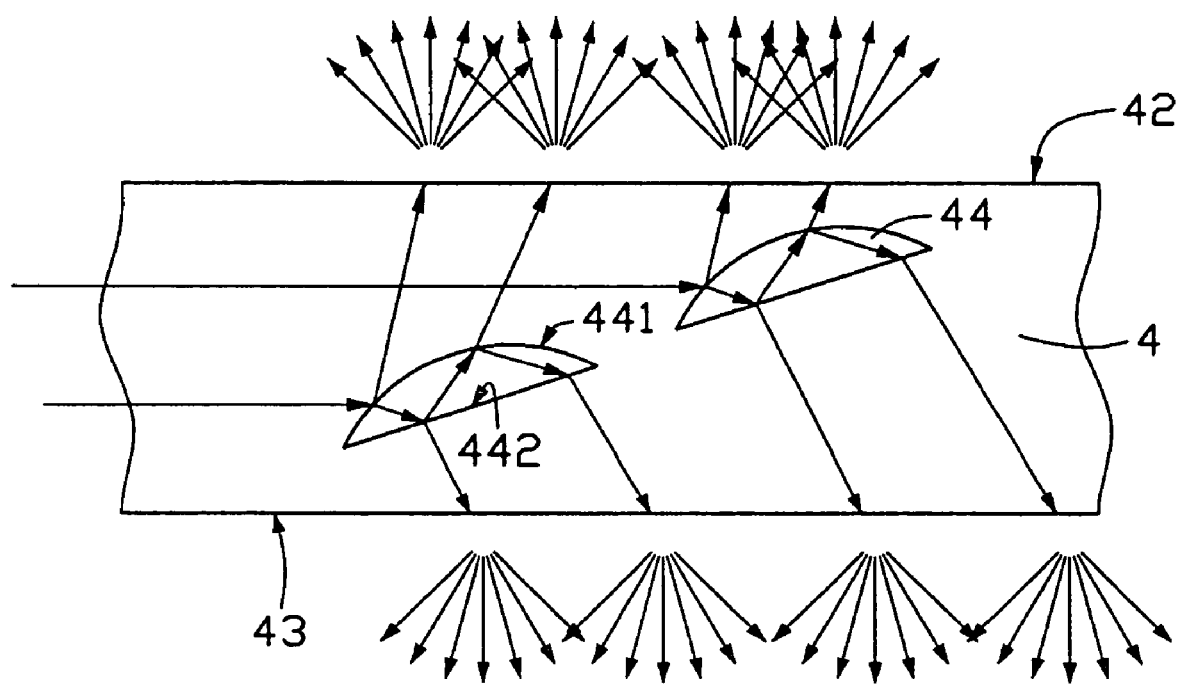
FIG. 4 is a schematic, cross-sectional view of a light guide plate according to the prior art, showing essential optical paths thereof.

FIG. 3 is a schematic, cross-sectional view of a backlight module 3 in accordance with a preferred embodiment of the present invention, the backlight module 3 incorporating the light guide device 1 described above. The backlight module 3 includes the light guide device 1, a light source 31, and two light diffusers 32, 33. The light guide device 1 includes the light guide plate 11 and the reflective mirror 10. The light guide plate 11 has one light receiving surface 111, and two opposite light emitting surfaces 112, 113. The reflective mirror 10 is located between the light emitting surfaces 112, 113, and is integrally manufactured with the light guide plate 11. The light source 31 faces toward the light receiving surface 111 of the light guide device 1. The light source 31 may be a light emitting diode or a phosphor lamp. Alternatively, the light source 31 may be omitted, and natural light relied upon instead. The light diffusers 32, 33 are located adjacent the light emitting surfaces 112, 113 of the light guide device 1 respectively.

Although only preferred embodiments have been described in detail above, it will be apparent to those skilled in the art that various modifications are possible without departing from the inventive concepts herein. Therefore the invention is not limited to the above-described embodiments, but rather has a scope defined by the appended claims and allowable equivalents thereof.

What is claimed is:

1. A light guide device, comprising:
   a light guide plate including at least one light receiving surface and two opposite light emitting surfaces; and
   a light reflective mirror set between the light emitting surfaces, the light reflective mirror comprising a first interface configured for reflecting a first part of incident light to a first one of the light emitting surfaces, and an opposite second interface configured for reflecting a second part of the incident light to a second one of the light emitting surfaces.

2. The light guide device according to claim 1, wherein the light guide plate is generally flat, and has a uniform thickness.

3. The light guide device according to claim 1, wherein the light guide plate is curved.

4. The light guide device according to claim 1, wherein the light guide plate is wedge-shaped.

5. The light guide device according to claim 1, wherein the light reflective mirror is set midway between the light emitting surfaces.

6. The light guide device according to claim 1, wherein the light reflective mirror is integrally manufactured with the light guide plate.

7. The light guide device according to claim 1, wherein the light reflective mirror further comprises reflective dots on the first interface and the second interface thereof.

8. The light guide device according to claim 7, wherein the light reflective mirror has reflective dots distributed over an entire area of the first interface thereof, and reflective dots distributed over part of the second interface thereof.

9. The light guide device according to claim 7, wherein the light reflective dots are hemispherical.

10. The light guide device according to claim 7, wherein the light reflective dots are dome-shaped.

11. The light guide device according to claim 7, wherein the light reflective dots are pyramidal.

12. A backlight module comprising:
    a light guide device, comprising:
    a light guide plate having at least one light receiving surface and two opposite light emitting surfaces; and
    a light reflective mirror integrally set in the light guide plate between the light emitting surfaces of the light guide plate, the light reflective mirror comprising a first interface and an opposite second interface, each interface being wholly in contact with adjacent portions of the light guide plate;
    at least one light source facing toward the light receiving surface; and
    two light diffusers located adjacent opposite sides of the light guide device respectively.

13. The backlight module according to claim 12, wherein said light reflective mirror has light reflective dots forming part of said first interface and light reflective dots forming part of said second interface of said light reflective mirror.

14. The backlight module according to claim 13, wherein said light reflective dots are hemispherical.

15. The backlight module according to claim 13, wherein said light reflective dots are semi-spheroid, dome-shaped, conical, or frustum-shaped.

16. The backlight module according to claim 13, wherein said light reflective dots are diamond-shaped or pyramidal.

17. The backlight module according to claim 12, wherein the at least one light source is selected from the group consisting of a light emitting diode and a phosphor lamp.

18. A display device comprising:
    a light source providing light for said display device; and
    a light guide device disposed next to said light source to receive said light from said light source, said light guide device defining two light emitting surfaces thereon to emit said received light out of said light guide device for further use of said display device, a light reflector disposed in said light guide device, said light reflector comprising a first interface, an opposite second interface, reflective dots forming part of said first interface, and reflective dots forming part of said second interface, said light reflector being capable of separating said received light into two groups of light and reflecting each group of light toward one of said two light emitting surfaces respectively.

19. The display device according to claim 18, wherein said light reflector is made of silver.

* * * * *